March 22, 1966 E. G. UNRATH 3,241,215
PIPE MILL FOR THE SELECTIVE PRODUCTION OF ELECTRIC
RESISTANCE WELDED PIPE AND CONTINUOUS WELDED PIPE
Filed Dec. 7, 1962 2 Sheets-Sheet 1

INVENTOR.
ERNEST G. UNRATH,
BY
ATTORNEYS.

March 22, 1966    E. G. UNRATH    3,241,215
PIPE MILL FOR THE SELECTIVE PRODUCTION OF ELECTRIC
RESISTANCE WELDED PIPE AND CONTINUOUS WELDED PIPE
Filed Dec. 7, 1962    2 Sheets-Sheet 2
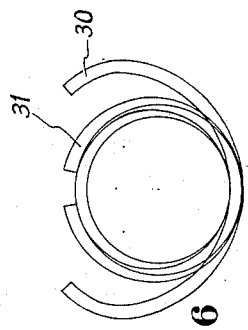
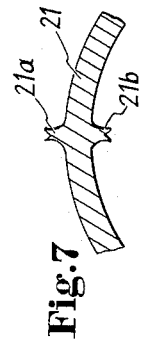
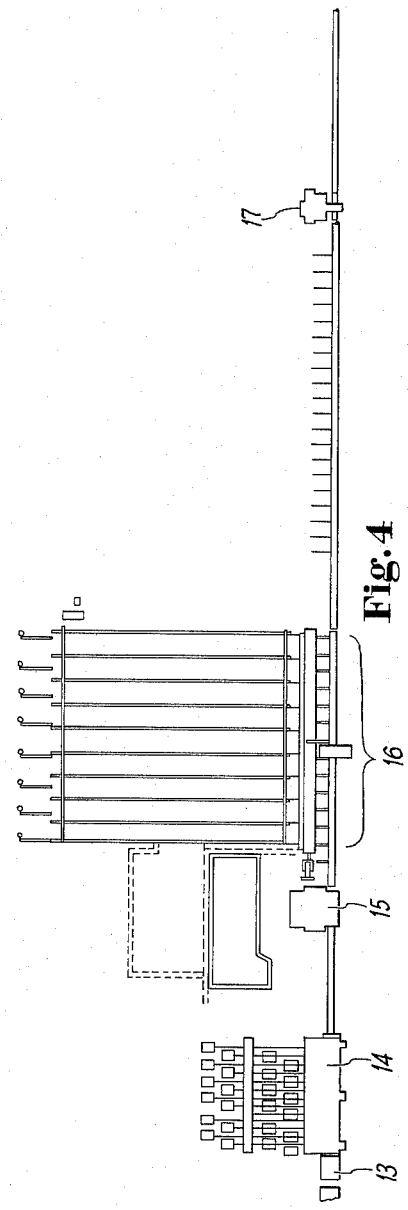
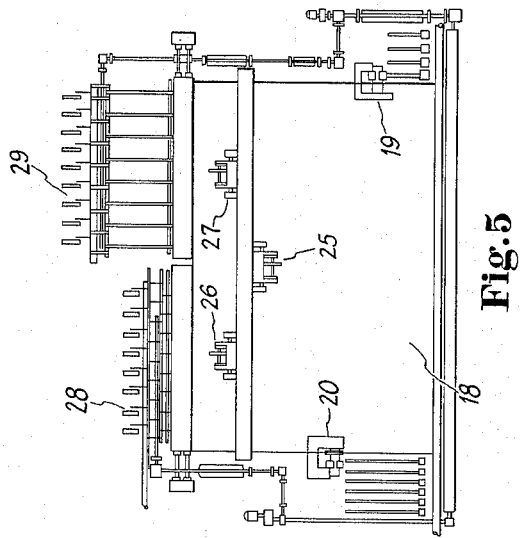
INVENTOR.
ERNEST G. UNRATH,
BY
ATTORNEYS.

United States Patent Office 3,241,215
Patented Mar. 22, 1966

3,241,215
PIPE MILL FOR THE SELECTIVE PRODUCTION OF ELECTRIC RESISTANCE WELDED PIPE AND CONTINUOUS WELDED PIPE
Ernest G. Unrath, Pittsburgh, Pa., assignor to Armco Steel Corporation, Middletown, Ohio, a corporation of Ohio
Filed Dec. 7, 1962, Ser. No. 243,133
2 Claims. (Cl. 29—33)

This invention relates to a pipe mill and more especially to a particular arrangement of apparatus in a pipe mill, and to a method of making continuous welded pipe such that either continuous welded pipe or electric resistance welded pipe may be made selectively on the same mill with most of the apparatus being used in the manufacture of both types of welded pipe.

The term "continuous welded pipe," or CW pipe as it is commonly referred to, is generally used for water and gas lines in residences and for electrical conduit and the like. It is probably the cheapest grade of pipe available. CW pipe is normally hot formed after heating the entire width of the flat skelp practically to the welding temperature. The skelp is hot formed to a generally tubular form and an air or oxygen blast is normally applied to the edges of the skelp to raise the edge temperature to that required for welding. The edges are then pressed together in a set of rolls in a welding mill train of rolls to produce a pressure weld or forge weld.

Electric resistance welded pipe, or ERW as it is generally referred to, is ordinarily used for high pressure lines, cross country line pipe, oil well casing and tubing, boiler tubes, condenser tubes, heater tubes, heat exchange tubes, structural pipe and many other purposes where a tube or pipe of higher quality is required than is obtainable with continuous welded pipe. The weld in ERW pipe is also a pressure weld or forge weld wherein the pipe edges are upset at the weld juncture. The weld is performed by means of a combination of an electric resistance welding electrode which rapidly heats the edges to be welded, with rolls applying pressure to the edges while they are being heated. Usually as a part of the welding operation, the flash which is formed inside and outside the pipe during the welding operation is removed by trimming or reduced by rolling. The welding machine usually includes also sizing and decambering means; and after the pipe has been welded and sized, it is in some instances passed through a heating furnace after which it may be sized or stretch reduced in a stretch reducing mill to the required outside diameter and wall thickness.

In the forming of CW pipe, the skelp is usually bent downwardly so that the weld is produced at the bottom of the pipe. This is to prevent molten oxides and the like from accumulating and draining down over the pipe.

From the foregoing rather brief descriptions of the currently practiced procedures for making ERW pipe and CW pipe, it will be seen that quite different pipe mills are conventionally required to produce these different types of pipe. Obviously, to produce both types of welded pipe, separate pipe mills have been required in the past. If the demand for ERW pipe should increase at the expense of demand for CW pipe, the operations of the CW mills would decline and the investment in the CW pipe mills would be substantially lost.

With the foregoing considerations in mind, it is an object of the present invention to provide a mill of such character that all of the sizes of CW pipe can be provided from few widths of skelp with a minimum number of thicknesses or gauges. It is an ancillary object to permit the production of electric resistance weld pipe in the full range of CW sizes and to permit the production of other ERW sizes up to the maximum equivalent tube diameter from the cold forming mill, and in addition to permit making other ERW sizes up to the capacity of the pipe mill. The apparatus of the mill of the present invention is so arranged that in a relatively short time it can be converted from making ERW pipe to the making of CW pipe or vice versa.

These and other objects of the invention which will be pointed out in greater detail hereinafter or which will become apparent to one skilled in the art upon reading these specifications are accomplished by that certain construction and arrangement of parts of which the following is a description of one embodiment thereof.

Reference is now made to the drawings forming a part hereof and in which:

FIGS. 1 to 5 inclusive represent an end to end diagrammatic plan view of a mill according to the present invention broken down into five figures for convenience.

FIG. 6 is a diagram to assist in an understanding of the novel method of making CW pipe.

FIG. 7 is a fragmentary cross-sectional view through the weld formed by electric resistance welding; and FIG. 8 is a fragmentary cross-sectional view through a weld formed by continuous welding.

The numeral 1 diagrammatically illustrates a conventional decoiling and leveling apparatus. Edge cleaning apparatus is indicated at 2. A cold forming apparatus is indicated at 3, and an electric resistance welding apparatus is indicated at 4.

Figure 1:
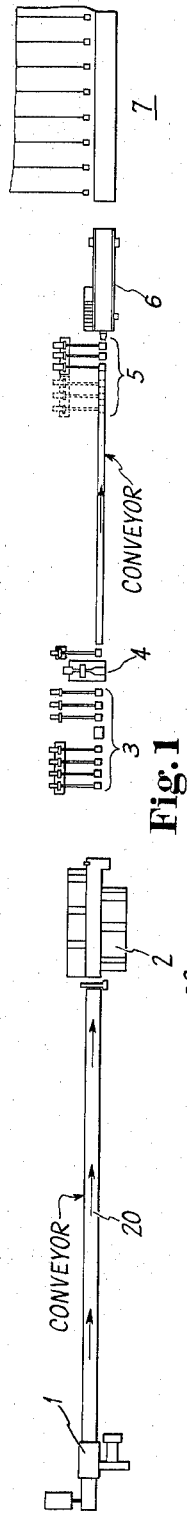
Figure 2:
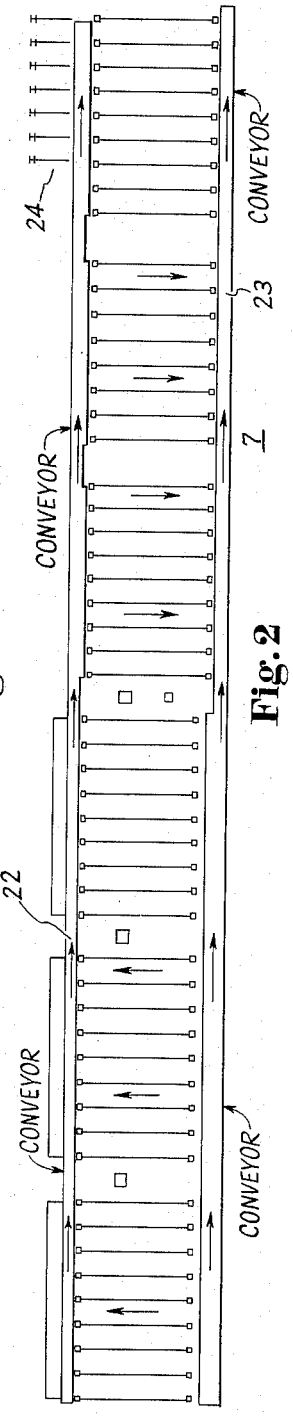
Figure 3:
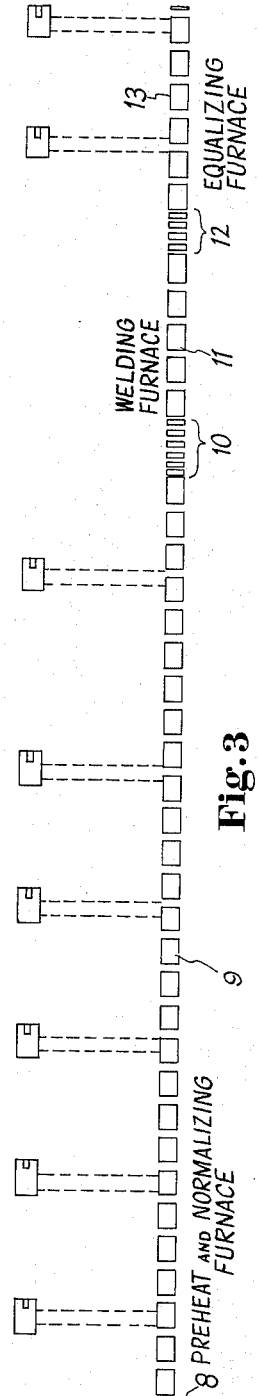

The numeral 5 indicates a cold sizing mill and a flying cut-off apparatus is indicated at 6. The apparatus at the right-hand end of FIG. 1 and indicated at 7 occupies all of FIG. 2 and constitutes a transfer apparatus which will be described in more detail hereinafter. In FIG. 3 the numeral 8 identifies a carbon black machine, the purpose of which will be discussed hereinafter and the numeral 9 designates a combination preheating and normalizing furnace. At 10 there is provided a hot forming mill, at 11 a welding furnace and at 12 a welding mill.

The numeral 13 again designates a furnace which may be referred to as a temperature equalizing furnace, and a stretch reducing mill is shown at 14 in FIG. 4. This stretch reducing mill is so arranged that it can be used as a sizing mill, a regular reducing mill, or as a mill to increase wall thickness to a degree. 15 represents a flying hot saw and 16 a cooling table. A hot sizing mill is shown at 17 and a cooling bed at 18. In FIG. 5 the saws for cutting the front and back end crops and for cutting pipe to lengths are also shown and these will be described in more detail hereinafter. It will be understood that suitable shears may be used instead of saws and wherever the term "saw" is used hereinafter or in the claims, it should be understood to be inclusive of shears.

Taking up first the manufacture of electric resistance welded pipe, the passage of the material through the mill will be described step by step. Skelp in coil form is provided for the decoiling and leveling machine 1. It will be understood that if the skelp has not been slit, it will be edge trimmed and the apparatus at 1 in conventional manner will open the coil and level it and feed the skelp in strip form along the conveyor 20 to the edge cleaning apparatus indicated at 2. Here the edges are generally sand or shot blasted to prepare them for welding. The conveyor 20 is so arranged as to be a speed pick-up conveyor whereby the front end of the incoming coil can travel faster than the trailing end of the coil which has passed through the leveling machine so as to reduce the gap between coil ends to the desired minimum. The apparatus preceding the conveyor is likewise overspeeded to match the conveyor speed. In the apparatus indicated at 3, the skelp is formed upward through a series of forming rolls until it reaches a substantially tubular form with the edges which are to be welded spaced slightly apart. The formed pipe then passes through the welding machine 4 where an electric resistance welding electrode comprising two copper members riding one on each edge and insulated from each other, heats the edges to be welded up to welding temperature.

It will be understood that the weld produced in the electric resistance welding machine will have the appearance in FIG. 7 where the welded pipe is indicated at 21, and in the area of the weld there will be a flash as at 21a and 21b on the inside and outside of the pipe. Means are provided to remove this flash substantially as a part of the welding operation.

At 5 the welded pipe passes through a cold sizing and decambering apparatus and proceeds to the flying cut-off device 6 where it may be cut into lengths from forty-two feet to two hundred feet. The cut pipe then moves along to the transfer apparatus shown in FIGS. 1 and 2. At this point and considering the left half of the transfer apparatus of FIG. 2, lengths of pipe may be kicked off for inspection of the electric welds, for reconditioning of the welds and for blow-out and flattening tests. The pipe then passes on to the conveyor 22 to the right-hand half of FIG. 2, where it is again conveyed on to the conveyor 23 for further passage through the apparatus. At 24 there is diagrammatically indicated an arrangement of skids by means of which seamless pipe which is produced at another location may be brought into the heating and stretch reducing mill operations. This seamless pipe or tubing may then be subjected to all the further steps of the operation although it will not have been welded.

ERW pipe, having had the flash trimmed, will be shiny in the area which is exposed after flash trimming, and therefore this pipe passes through a carbon black machine 8 which is simply for the purpose of blackening the shiny area and thus increasing its heat absorption properties in order to avoid bowing of the pipe in the preheating or normalizing furnace. The pipe then passes into the preheating or normalizing furnace 9 wherein its temperature is raised to between 1600° F. and 1850° F., depending upon whether the pipe is to be sized or stretch reduced. If it is to be stretch reduced, its temperature will be increased further in another furnace indicated at 13 in the drawings.

From the furnace 9, the electric resistance welded pipe is caused to by-pass or dummy through the apparatus indicated at 10, 11 and 12 and which will be described hereinafter, and thus the pipe arrives at the temperature equalizing furnace 13 where the temperature can be increased and whence it passes into the stretch reducing mill 14 which in and of itself forms no part of the present invention, and in which the diameter and wall thickness may be reduced to the desired dimensions. At 15 there is provided a flying hot saw. This is preferably used for cutting small diameter pipe to multiple length. By small diameter is meant from .840 inch to four and one-half inch outside diameter. Where pipe of larger diameter is being manufactured, it is simply permitted to dummy through the flying hot saw. The cooling table 16 is used where it is desired to take off pipe having an outside diameter from two and three-eighths inches to eight and five-eighths inches (or the maximum diameter of the mill), which pipe is to be transferred to another department of the mill for further processing. If further sizing is required, the pipe then passes through the sizing mill 17 which may have a capacity to size pipe having diameters from 0.840 inch to four and one-half inches. This sizing operation is provided as a round-up operation in case the flying hot saw flattens the ends of the larger sizes of pipe. The cooling bed 18 is provided for cooling pipe which is cut by the flying hot saw into lengths from eighty feet to one hundred feet and having a diameter from .840 inch to four and one-half inches. As the pipe passes upward in FIG. 5 (i.e. transverse to the axis of the pipe mill), saws are provided for cropping the front and back ends of the pipe, since the pipe made from the starting and finishing ends of each coil is defective because of the heavy wall thickness produced in the stretch reducing mill, and these ends must therefore be cropped. These cropping saws are indicated generally at 19 and 20. Thereafter the pipe passes to the three saws 25, 26 and 27 which cut it first in half and then each of the halves in half, so that four pieces of pipe of a length between twenty and twenty-five feet each are delivered to the conveyors 28 and 29 which convey them to the finishing department for further processing or the like.

The foregoing description has dealt with the manufacture of electric resistance welded pipe and the various apparatuses are generally conventional. The basic difference between the pipe mill thus far described and a conventional mill resides in the elements indicated at 10, 11 and 12. These are used according to the present invention only in the manufacture of continuous welded pipe on this mill, and continuously welded pipe is dummied through certain of the apparatus used in the manufacture of electric resistance welded pipe as indicated at 2, 4, 5, 6 and 8.

Basically in order to produce continuous welded pipe on this mill, the continuous welded pipe must be cold formed initially rather than being hot formed as has always been the practice in CW pipe; it must be partially formed with the seam on top rather than underneath as has generally been the practice, and it must then be subjected to an aditional forming operation and the continuous welding operation. In order to clarify the manufacture of continuous welded pipe, the procedure of manufacturing such pipe on the mill of the present invention will now be described.

As before, the skelp in coil form is delivered to the decoiling and leveling apparatus, and is decoiled and flattened and passed along the conveyor 20. As previously pointed out, the conveyor 20 is a speed pick-up conveyor to reduce the gap between coil ends to the desired minimum. The edge cleaning apparatus 2 is now rendered ineffective and is used simply as a conveying means. If desired, it may be moved out of the way of the skelp in any manner. The skelp enters the cold forming apparatus 3 as with ERW pipe and is partially formed up to the configuration indicated diagrammatically in FIG. 6 at 30, by changing the top rolls of some of the final forming mill stands and using these top rolls with fin bases for producing an edge bevel on the split edge skelp by cold working. It must be borne in mind that contrary to the usual practice, this is a cold forming operation; and contrary to the usual practice the seam will be on top of the pipe.

The partially formed pipe is then dummied through the apparatus indicated at 4, 5, 6 and 8, except that at the cold sizing apparatus 5 one or more vertical fins or frogs may be provided to enter in between the edges which are to be welded, to act as a guide, thereby maintaining the seam at the top of the pipe and preventing it from wandering around the pipe. The pipe then enters the preheating and normalizing furnace 9 except that it is now heated to a temperature of from 1800° F. to 2200° F. which is on the average about 300° higher than was the case for ERW pipe. The preheated and partially formed pipe then enters the forming mill 10 wherein it is further formed up to the configuration indicated at 31 in FIG. 6, so as to narrow the gap between the edges to be welded. The formed pipe then passes through the furnace 11 which is arranged to heat approximately the upper half of the pipe circumferentially so that the edges are raised to a temperature of approximately 2450° F. and the remaining portion of the pipe gradually decreases in temperature to about 2000° F. at the bottom, which is the temperature of the pipe entering the furnace 11. This heating is referred to in the claims as auxiliary heating, and the means producing it as auxiliary heating means. The purpose of this auxiliary heating is to distribute plastic deformation of the metal over a longer portion of the circumference than would occur if the edges only were heated to a temperature substantially hotter than the remainder of the pipe. As this pipe enters the welding mill 12, an air blast or oxygen blast is played on the edges to be welded causing these edges to increase in temperature and raise the edge temperature to pressure welding temperature.

This welding operation does not produce a flash and therefore no flash trimming apparatus needs to be provided. The weld will have approximately the configuration shown in FIG. 8 and in some instances with slight depression 31b inside the pipe.

As in the case of ERW pipe, the pipe then passes through a temperature equalizing furnace at 13 and enters the stretch mill 14. Pipe up to four and one-half inch outside diameter is then cut by the flying hot saw 15 as before. The pipe is permitted to dummy past the cooling table 16 and passes to the sizing mill 17 where, if necessary, sizes from .084 inch to 4.500 inches outside diameter can be given a final sizing operation, and thence to the cooling bed 18 and the cropping saws and quartering saws 19, 20, 25, 26 and 27 as before.

The particular means for permitting pipe to dummy through certain parts of the apparatus may be of any kind. In the case of sizing rolls and the like, the rolls may simply be moved apart or used as conveyor rolls or if desired an apparatus may simply be rolled out on rails or lifted out of position with a crane. The process of converting the entire pipe mill from the manufacture of either type of pipe to the other may be accomplished in a matter of an hour or two. The things that make it possible to accomplish the continuous welding of pipe include the novel method of cold forming the CW pipe partially as an initial step, and then as a later step carrying out a further forming and welding operation and the carrying out of the forming operation in such manner as to provide the seam at the top of the pipe rather than at the bottom as has heretofore been the usual practice.

While the apparatus and the method have been described in considerable detail, it will be clear that many modifications may be made without departing from the spirit of the invention. No limitation is therefore intended which is not clearly set forth in the claims.

What is claimed is:

1. A pipe mill for the manufacture, alternatively, of continuous pressure welded pipe or electrical resistance welded pipe, consisting of a machine comprising: a decoiling apparatus for coiled stock, means for flattening stock decoiled by said decoiling apparatus, cold forming means for forming said flattened stock into pipe shape with the edges to be wlded on the top of the formed pipe, electric resistance welding apparatus for welding said edges together, cold sizing means for sizing and straightening pipe welded by said resistance welding apparatus, a preheating and normalizing furnace for alternatively normalizing pipe which has been welded by said resistance welding apparatus or preheating formed pipe which has not been welded by said resistance welding apparatus, hot forming means for closing the edges of formed pipe which has not been resistance welded, to prepare it for pressure welding, auxiliary heating means for heating the edges to be welded to pressure welding temperature, a pressure welding machine for pressure welding formed pipe which has not been resistance welded, a temperature equalizing furnace for bringing the welded pipe to uniform temperature entirely around its periphery, a stretch mill for reducing the welded pipe to a predetermined diameter and wall thickness, and a saw combination for cropping ends and cutting the completed pipe to length; means for rendering ineffective said hot forming means, auxiliary heating means, and said pressure welding machine in the production of electric resistance welded pipe; and means for rendering ineffective said electric resistance welding apparatus, and cold sizing means in the production of continuous welded pipe.

2. A unitary pipe mill for the manufacture, alternatively, of continuous pressure welded pipe or electrical resistance welded pipe, said mill comprising a cold forming apparatus for continuously forming coiled steel strip into straight seam pipe shape, with the edges to be welded at the top of the formed pipe, a pressure welding apparatus, a resistance welding apparatus, an apparatus for finishing pipe welded by said pressure welding or resistance welding apparatus, and means for rendering ineffective said pressure welding apparatus in the manufacture of resistance welded pipe, and means for rendering ineffective said resistance welding apparatus in the manufacture of pressure welded pipe.

References Cited by the Examiner

UNITED STATES PATENTS

| | | | |
|---|---|---|---|
| 1,991,973 | 2/1935 | Anderson | 78—87 |
| 2,003,118 | 5/1935 | Mirfield | 29—33.4 |
| 2,024,485 | 12/1935 | Sussman | 29—33.4 |
| 2,084,889 | 6/1937 | Blevins | 29—33.4 |
| 2,277,473 | 3/1942 | Anderson | 29—477.7 |
| 2,302,163 | 11/1942 | Anderson | 29—477.7 |
| 2,581,673 | 1/1952 | Kennedy | 29—477.7 |

RICHARD H. EANES, JR., *Primary Examiner.*